United States Patent
Ripley et al.

(10) Patent No.: US 6,942,437 B2
(45) Date of Patent: Sep. 13, 2005

(54) MILLING CUTTING TOOL HAVING CUTTER BODY MATED TO AN ADAPTER

(75) Inventors: Frank R. Ripley, Machesney Park, IL (US); Jay C. Bilyeu, Winnebago, IL (US)

(73) Assignee: Ingersoll Cutting Tool Company, Rockford, IL (US)

( * ) Notice: Subject to any disclaimer, the term of this patent is extended or adjusted under 35 U.S.C. 154(b) by 40 days.

(21) Appl. No.: 10/735,657

(22) Filed: Dec. 16, 2003

(65) Prior Publication Data

US 2005/0129475 A1 Jun. 16, 2005

(51) Int. Cl.$^7$ .......................... B23C 5/22; B23B 31/107
(52) U.S. Cl. ...................... 409/234; 409/232; 279/93; 403/350; 408/232; 408/239 A
(58) Field of Search .................. 409/234, 232; 408/239 R, 239 A, 232, 231, 226, 238, 227; 403/348, 350, 351, 352, 343, 360; 279/93; 407/34

(56) References Cited

U.S. PATENT DOCUMENTS

| | | | | |
|---|---|---|---|---|
| 2,158,120 A | * | 5/1939 | Hirschberg | ................ 403/343 |
| 4,204,787 A | | 5/1980 | McCray et al. | |
| 4,534,101 A | * | 8/1985 | Rosan, Jr. | .................... 29/432 |
| 4,621,960 A | | 11/1986 | Tollner | |
| 6,276,879 B1 | * | 8/2001 | Hecht | ......................... 409/234 |
| 6,540,449 B1 | * | 4/2003 | Bejerstål et al. | ............. 407/40 |

* cited by examiner

Primary Examiner—Derris H. Banks
Assistant Examiner—Dana Ross
(74) Attorney, Agent, or Firm—Womble Carlyle

(57) ABSTRACT

A rotary milling cutter has a cutter body mountable on an adapter. A first side of the adapter is provided with circumferentially arranged drive pins centered about a centrally positioned, conically tapered male locating member. A first side of the cutter body is provided with circumferentially arranged drive grooves centered about a centrally positioned, conically tapered female locating member. The drive pins have a base portion connected to a head portion while the drive grooves have an insertion portion connected to a retaining portion. During assembly, the first side of cutter body and the first side of the adapter are first moved into an initial mating position in which the drive pins enter the insertion portions of the drive grooves and the male locating member enters the female locating member. The cutter body is then rotated relative to the adapter such that the drive pins enter the retaining portions of the grooves. With the adapter retained in an inverted position with its drive pins extending vertically downward, the cutter body may thus be supported by the heads of the drive pins. A center bolt normally resident in a throughbore of the cutter body is then screwed into a threaded bore formed in the male locating member of the adapter.

48 Claims, 6 Drawing Sheets

MILLING CUTTING TOOL HAVING CUTTER BODY MATED TO AN ADAPTER

RELATED APPLICATIONS

None

FIELD AND BACKGROUND OF THE INVENTION

The present invention relates to metal cutting machine tools. More particular, it pertains to a rotary milling cutting tool assembly that includes a milling cutter body and an adapter, and mechanisms for mating the former to the latter.

U.S. Pat. No. 4,204,787 discloses a milling cutter assembly comprising a rotatable adapter mated to a cutter ring. The rotatable adapter has a central protrusion on a first side thereof that, in the assembled state, extends through a central opening in the cutter ring. The central protrusion 16 is preferably tapered near the end that protrudes farthest from the cutter adapter. A peripheral area of the cutter ring is provided with bayonet slots which extend through a thickness thereof. Bolts extend through the bayonet slots and threadedly engage the adapter. The bolts form a clamping means, thereby holding the cutter ring and cutter adapter in a rigid, nonrotatable relationship.

SUMMARY OF THE INVENTION

In one aspect, the present invention is directed to a milling cutting tool assembly comprising an adapter, a cutter body having a throughbore, and a bolt. The adapter has an adapter central axis, adapter first and second sides, a centrally located male locating member projecting from the adapter first side and provided with a threaded bore in a central portion thereof, and a plurality of circumferentially spaced-apart drive pins projecting from the adapter first side. The cutter body has a cutter central axis, cutter body first and second sides, a centrally located female locating member formed in the cutter body first side, a plurality of circumferentially spaced-apart drive grooves formed in the cutter body first side, each drive groove having an insertion portion connected to a retaining portion, and a throughbore extending along the cutter central axis and communicating with the female locating member.

The bolt occupies the throughbore. A retaining ring may be used to keep the bolt in the throughbore. The assembly is adjustable from a first position in which the adapter and the cutter body are separated from one another, to a second position in which the male locating member is nested in the female locating member and at least two drive pins are positioned in a corresponding number of respective drive grooves' insertion portions. The assembly is further adjustable from the second position to a third position in which the at least two drive pins are positioned in their respective drive grooves' retaining portions, upon rotation of the cutter body relative to the adapter. When the assembly is in the third position, the cutter body is securable to the adapter upon insertion of the bolt into the threaded bore of the male locating member, and without tightening the drive pins in the retaining portions of the grooves.

In another aspect, the present invention is directed to a method for assembling a milling cutting tool comprising an adapter and a cutter body, wherein the adapter has previously been mounted in an inverted position, the adapter having a male locating member provided with a threaded bore in a central portion thereof, and a plurality of circumferentially spaced-apart drive pins, and wherein the cutter body is provided with a female locating member, a plurality of circumferentially spaced-apart drive grooves, each drive groove having an insertion portion connected to a retaining portion, and a throughbore communicating with the female locating member. The method entails raising the cutter body towards the adapter with the female locating member and drive grooves facing upwards, until the drive pins enter the insertion portions of the drive grooves and the male locating member enters the female locating member, rotating the cutter body such that the drive pins enter the retaining portions of the drive grooves, releasing the cutter body such that it is suspended from the adapter by virtue of the retaining portions of the drive grooves being supported by the drive pins, inserting a bolt into the threaded bore of the male locating member, thereby securing the cutter body to the adapter without tightening the drive pins in the retaining portions.

In another aspect, the present invention is directed to a milling cutting tool comprising an adapter, a cutter body and a bolt. The adapted has an adapter central axis and comprises adapter first and second sides, a centrally located male locating member projecting from the adapter first side and provided with a threaded bore in a central portion thereof, and a plurality of circumferentially spaced-apart drive pins projecting from the adapter first side. The cutter body has a cutter central axis, cutter body first and second sides, a centrally located female locating member formed in the cutter body first side, a plurality of circumferentially spaced-apart drive grooves formed in the cutter body first side, each drive groove having an insertion portion connected to a retaining portion, and a throughbore extending along the cutter central axis and communicating with the female locating member. The bolt is inserted into the threaded bore of the male locating member to thereby secure the cutter body to the adapter while the male locating member is nested in the female locating member and the drive pins are positioned in the retaining portions of the drive grooves without being in tight engagement therewith.

In another aspect, the present invention is directed to a cutter body having a cutter central axis, cutter body first and second sides, a centrally located female locating member formed in the cutter body first side, a plurality of circumferentially spaced-apart drive grooves formed in the cutter body first side, each drive groove having an insertion portion connected to a retaining portion and a bottom surface, a throughbore extending along the cutter central axis and communicating with the female locating member. A bolt is loosely retained in the throughbore.

In yet another aspect, the present invention is directed to a set of at least four milling cutting tool components including at least first and second adapters, a left-handed cutter body and a right-handed cutter body. The first adapter mates only with a left-handed cutter body while the second adapter mates only with a right-handed cutter body, due to differing placements of the drive pins on the adapters.

BRIEF DESCRIPTION OF THE DRAWINGS

The invention will now be described, by way of example only, with reference to the accompanying drawings in which:

FIG. 6a is a view of the cutting assembly of FIG. 5b taken along the line 6a—6a;

FIG. 7a is a detailed view of a portion of FIG. 6a;

DETAILED DESCRIPTION OF THE INVENTION

Figure 1:
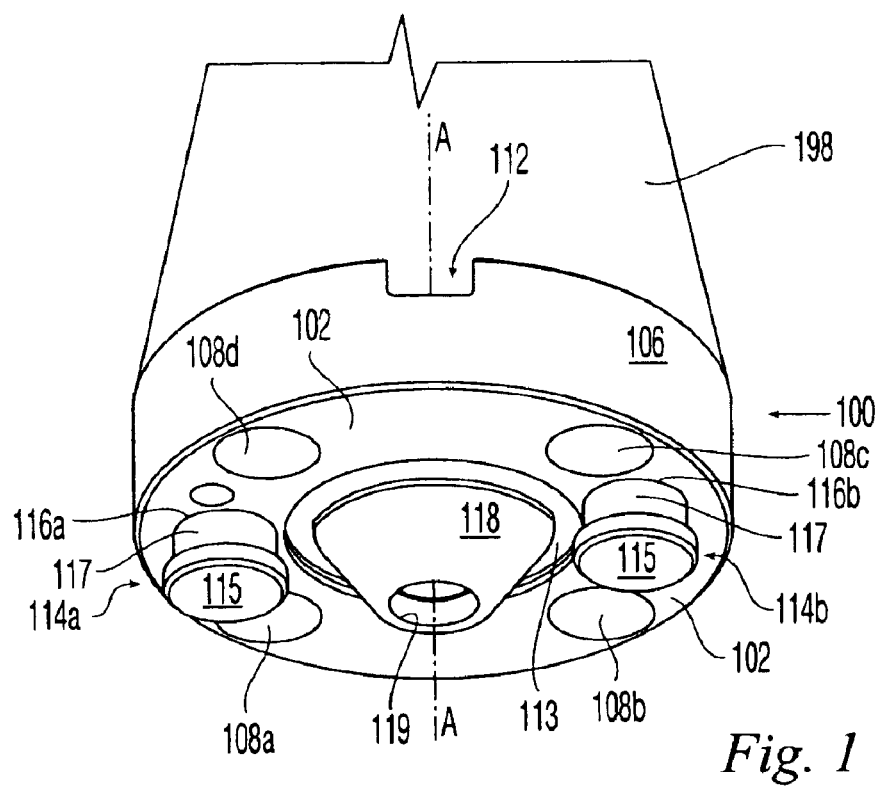
FIG. 1 is a perspective view of an adapter in accordance with the present invention, showing its first side, and mounted to a spindle.

FIG. 1 shows an adapter 100 in accordance with the present invention mounted at the end of a spindle 198, or the like, serving as a drive mechanism. In the environment of FIG. 1, the adapter is mounted on the spindle 198 in an "inverted" position, such as for use in boring operations where the workpiece is directly below the cutting tool.

The adapter 100, which has a disk-like shape, is formed from cast metal that has been machined or otherwise changed to a desired form. It has a central axis A, a first side 102, a second side 104 and a cylindrical outer sidewall 106 connecting the two sides. The adapter is provided with a plurality of through holes 108a, 108b, 108c, 108d that connect the first 102 and second 104 sides. Through holes 108a, 108b, 108c, 108d are used to mount the adapter 100 to the spindle 198. Mounting bolts (not shown) may be inserted via the first side 102 of adapter 100 such that their heads are recessed in the through holes so as not to interfere with any subsequent mating of the cutter body 200 to the adapter 100. Any such mounting bolts would emerge from the second side 104 of the adapter and be screwed into threaded holes (not shown) formed in the spindle 198.

An adapter indexing structure, such as an adapter alignment hole 110 may be provided on the second side 104 of the adapter 100 to ensure that the adapter is properly indexed relative to the spindle 198. The adapter alignment hole 110 may be mated to a complementary locating pin (not shown) provided on the spindle. Alternatively, the adapter alignment hole 110 may be threaded and the locating pin inserted therein, with the spindle being provided with a complementary alignment hole. Other indexing arrangements between the adapter and the spindle may also be possible.

The second side 104 of the adapter 100 is also provided with a drive receiving structures such as a keyway 112 formed by radially extending keyway portions 112a, 112b, and a hub, or pilot 111. The keyway 112 and pilot 111 are configured to mate with a complementary structure (not shown) associated with the spindle 198, for driving the adapter.

The first side 102 of the adapter 100 is provided with a plurality of drive pins 114a, 114b which extend in a direction along the central axis A. The drive pins may be spaced either evenly or irregularly spaced in a circumferential direction around the central axis A. Furthermore, the drive pins may be located along a common radius relative to the central axis A, but may instead be located at different distances from the central axis A.

Each drive pin 114a, 114b has a head portion 115 connected to a base portion 117. The base portion 117 has a narrower dimension, at least taken along one orientation, than the head portion 115. In a preferred embodiment, both the head portion and the base portion have cylindrical cross-sections, with the head portion 115 having a larger diameter than the base portion 117.

The two drive pins may have unitary construction with the adapter, i.e., the adapter and the drive pins all being formed from one continuous piece of material that has been cast and then possibly machined. More preferably, however, the first side 102 of the adapter is provided with a plurality of threaded drive pin holes 116a, 116b into which threaded shank portions 117a of the drive pins 114a, 114b, respectively, may be inserted and retained In such case, the drive pins may be formed as screws, shoulder bolts or the like, so long as they are suitable for transferring rotational motion of the adapter to the cutter body, and can also serve the purpose of cooperating with grooves formed in the cutter body to assist in assembly, as discussed herein.

Figure 3:
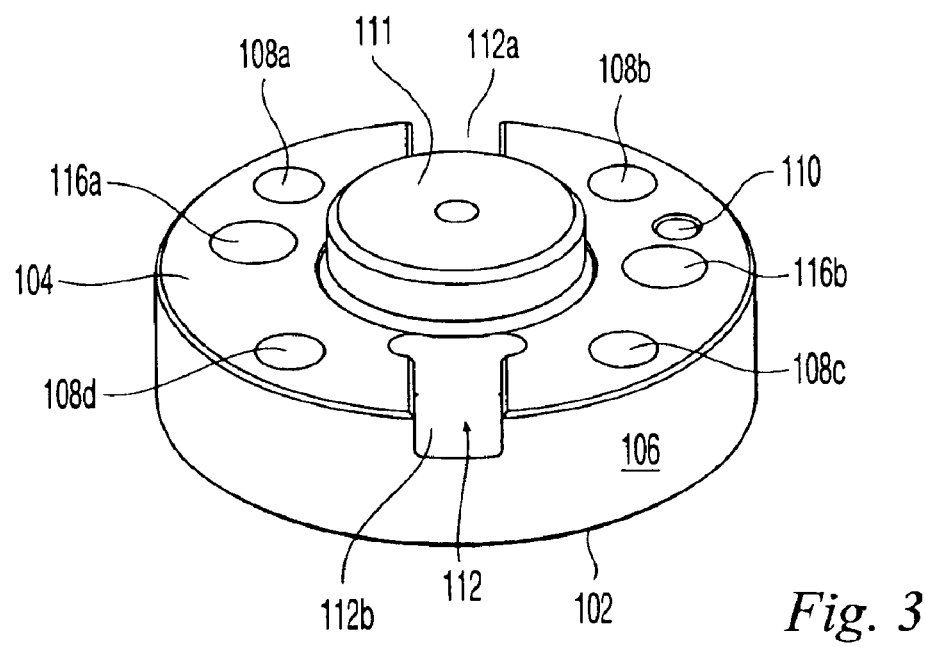
FIG. 3 is a perspective view of the adapter of FIG. 1 showing its second side.

The drive pin holes 116a, 116b may be through holes, in which case they extend through the thickness of the adapter and connect to the second side 104, as seen in FIG. 3.

Each drive pin 114a, 114b has a head portion 115 connected to a base portion 117. The base portion 117 has a smaller cross-section than the head portion 115. In a preferred embodiment, at least the base portion has a cylindrical cross-section. The head portion may also have a cylindrical cross-section, but it may be hexagonal or some other shape, instead.

While in the figures, the adapter is shown to have two drive pins, it may be provided with three, four or even more drive pins, and these can be either evenly or irregularly spaced about conical male member, and either at a common radius, or at different radii, from the central axis A.

A centrally situated, conically tapered male member 118 projects from the first adapter side 102 along said adapter central axis A. The male member 118 helps locate and center the cutter body 200 by mating with a complementary, conically tapered female member 232 formed on the cutter body 200.

The male member 118 is in the shape of a truncated cone. It rises from a recess 113 formed in a central portion of the first side 102 of the adapter 100. At its base, the diameter of the male member 118 is preferably between 30–50% of the diameter of the adapter. More preferably, however, it is about 35–45% of the diameter of the adapter and most preferably, it is about 40% of the diameter of the adapter. Thus, by way of example, in an adapter having a diameter of 3.5", the diameter of the male member's base is about 1.4". The height of the male member preferably is between 10–20% of the diameter of the adapter and in one embodiment is 0.5" inches high in adapter having a diameter of 3.5". Finally, the taper angle of the male member can vary from 20°–70°, although other taper angles may work, as well. The truncated end portion of the male member 118 is provided with a threaded bore 119 for receiving a threaded center bolt 230, as described further below.

Figure 6A:
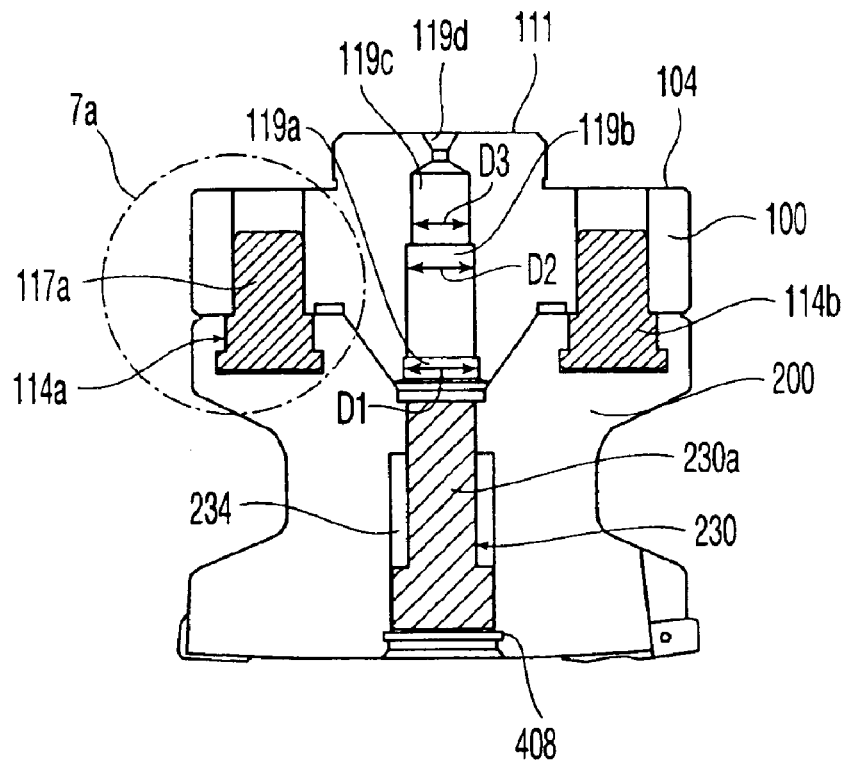
Figure 6B:
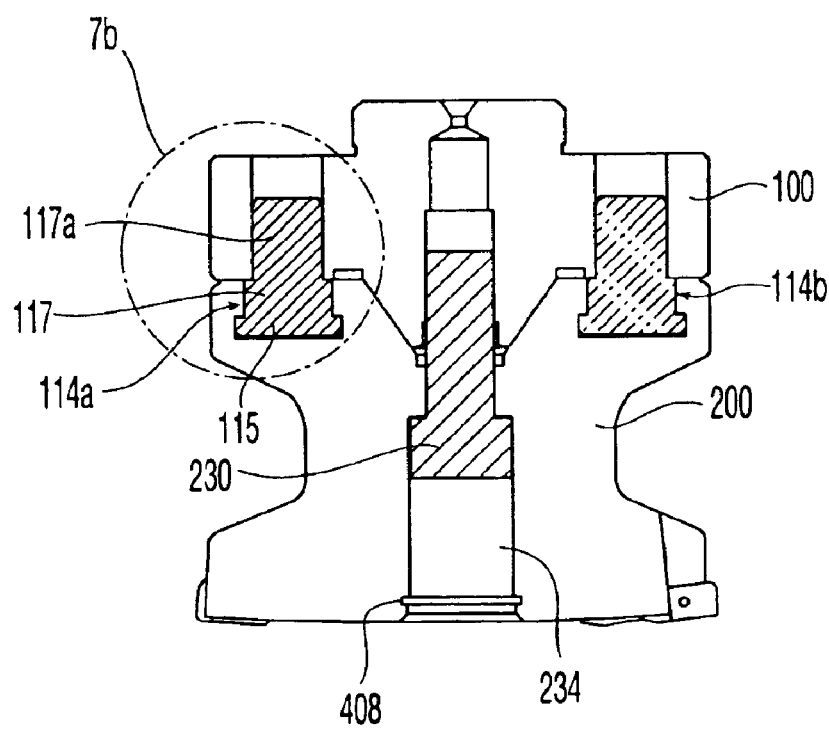
FIG. 6b is a view of the cutting assembly of FIG. 6a, after the bolt has been tightened.

As best seen in FIG. 6a, the threaded bore 119 is stepped, including an unthreaded insertion portion 119a having a diameter D1 that is axially connected to a threaded securing portion 119b having a diameter D2. The threaded securing portion 119b, in turn, is axially connected to an even tail portion 119c having a diameter D3, the tail portion axially communicating with an opening 119d formed on the pilot 111. The diameters of the portion 119a, 119b and 119c are such that D1>D2>D3.

The male member 118 preferably has a unitary construction with the adapter 100. Alternatively, however, the male member 118 may be provided on the distal, or bottom, end portion of a threaded plug that allows a human operator to adjust the extent to which the male member 118 protrudes on the adapter's first side 102.

Figure 2:
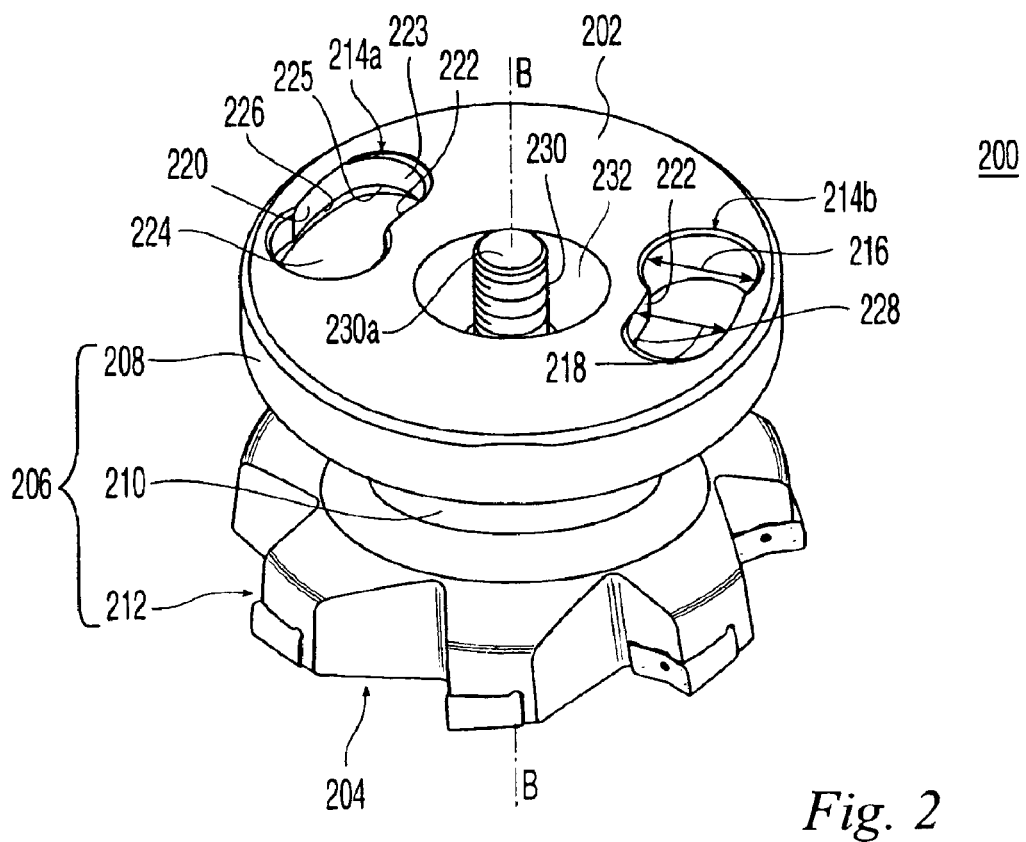
FIG. 2 is a perspective view of a cutter body's mounting arrangement in accordance with the present invention.

FIG. 2 shows a right-handed cutter body 200 in accordance with the present invention. The cutter body 200 has a central axis B, a first side 202 and a second side 204, and body portion 206 therebetween. In the embodiment shown, the body portion 206 includes a cylindrical base member 208 adjacent to the first side, a neck portion 210 adjacent to the cylindrical base member 208, and a cutting head portion 212 adjacent to the neck portion 210. The neck portion 210 has a smaller cross-section than either the base member 208 or the diametrical footprint of the cutting head portion 212, the cross-section being taken along the cutter body central axis B.

The first side 202 is provided with a pair of latching grooves 214a, 214b, which are configured to cooperate with drive pins 114a, 114b, respectively. Each groove comprises a wide insertion portion 216 connected to a narrow retaining portion 218. The retaining portion 218 is associated with opposing outer 220 and inner 222 groove sidewalls and groove back wall 223, all three of which at least partially overhang the groove bottom surface 224. Thus, undersides 226, 228, 225 of the outer 220 and inner 222 groove sidewalls and groove back wall 223, respectively, and are spaced apart from the groove bottom surfaces 224. And the spacing between these undersides 226, 228, 225 and the groove bottom 224 is greater than a thickness of the head 115 of the drive pins.

A conically tapered female member 232 is provided at the center of the cutter body first side 202. The female member 232, which is recessed relative to the flat surface of the cutter body first side 202, is complementary to the conically tapered male member 118 formed on the adapter 100. The female member 232 communicates with a throughbore 234 formed along the central axis B of the cutter body 200.

A center bolt 230 is used to secure the cutter body 200 to the adapter 100. During assembly, the center bolt may be inserted into the throughbore 234 through the second side 204 of the cutter body 200 so that it first enters the female locating member 232 and continues into the threaded bore 119 of the male locating member 118 to secure the cutter body 200 to the adapter 100 by engaging the threaded securing portion 119b.

To obviate the need to insert the center bolt 230 into the throughbore 234 each time the tool is assembled, the cutter body 200 may be modified so that the center bolt 230 is normally loosely retained in the throughbore 234, even when the cutter body 200 is separated from the adapter 100. This modification entails the use of a retaining member, such as a retaining ring 408, seated in a circumferential recess formed proximate to the second side 204 of the cutter body 200. In such case, the center bolt 230 is initially inserted through from the second side 204 of the cutter body. After the center bolt 230 has been inserted, the retaining ring 408 is seated in a circumferential recess formed near the opening of the throughbore on the second side 204 of the cutter body 200. The retaining ring 408 has a diameter smaller than that of the center bolt's head. Thus, once the retaining ring 408 has been installed, the center bolt 230 is prevented from falling out of the throughbore 234.

During assembly, the cutter body 200 and the adapter 100 start out in a first position in which they are separated from one another, the adapter's first side 102 facing vertically downwards and the adapter mounted to a spindle, or some other rotating apparatus, as seen in FIG. 1.

Figure 5A:
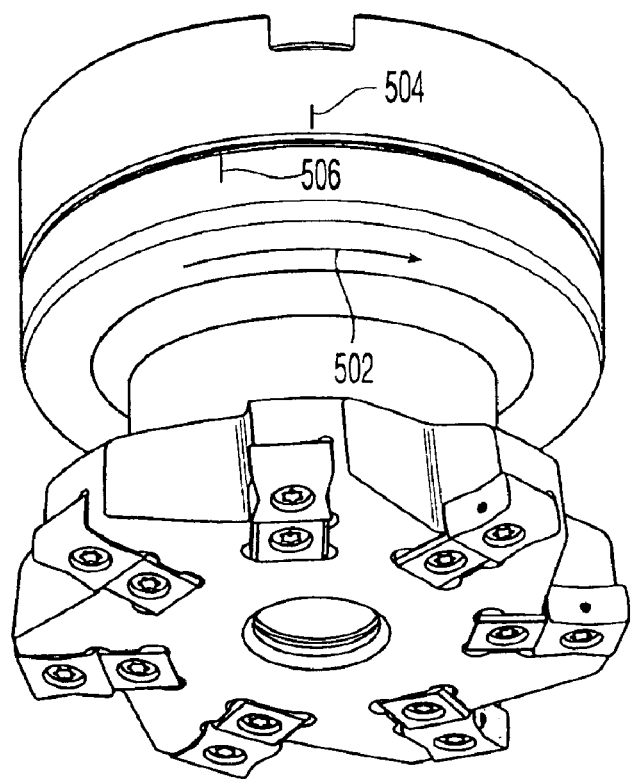
FIG. 5a is a perspective view of a cutting assembly comprising the adapter of FIG. 1 and the cutter body of FIG. 2, in the second position.

An operator may then grab the cutter body 200 with one hand and raise it towards the adapter 100 with respective first sides 204, 104, facing each other. The head portions 115 of the drive pins 114a, 114b first enter the insertion portions 216 of the drive grooves. As the cutter body is raised further, the head portions 115 proceed to abut the groove bottom surfaces 224, resulting in the assembly assuming a second position, as seen in FIG. 5a.

Figure 5B:
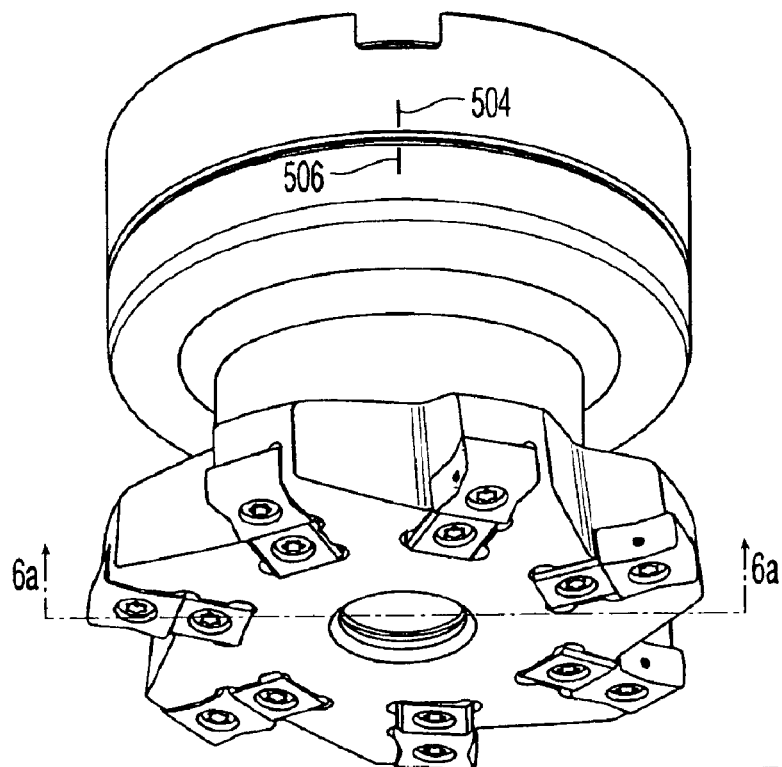
FIG. 5b is a perspective view of a cutting assembly comprising the adapter of FIG. 1 and the cutter body of FIG. 2, in the third position.
Figure 7A:
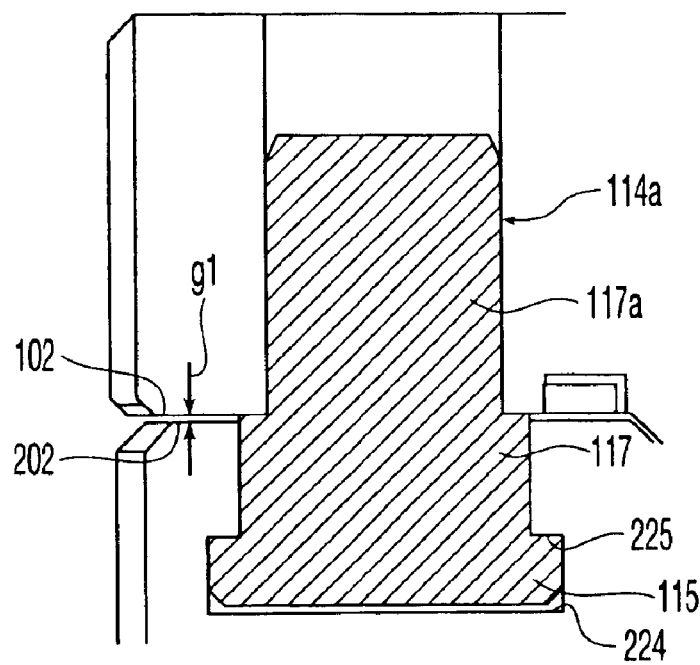

From this second position, the operator may then rotate the cutter body 200 in the direction indicated by arrow 502, so that the alignment marks 504, 506 coincide, and the assembly assumes the third position shown in FIG. 5b. In this third position, the drive pins 114a, 114b enter the retaining portions 218 of their respective drive grooves, with the bases 117 ultimately coming to abut the back walls 223 of the grooves' retaining portions and the heads 115 of the drive pins occupying a space between the undersides 225 of the back walls 223 and the groove bottoms 224. And with the adapter 100 inverted, the operator may release the cutter body 200, which will then be suspended from the adapter because the heads 115 of the drive pins abut the undersides 225 of the grooves' back walls 223, thereby supporting the cutter body 200. In this second position, there exists a small, non-zero gap of distance g1 between the first surface 102 of the adapter 100 and the first surface 202 of the cutter body, as shown in FIG. 7a.

Preferably, the center bolt 230 has a length such that, when the cutter body 200 is held with the cutter body first surface 202 facing upwards, the center bolt is retained in the throughbore with the center bolt's head 235 resting on the retaining ring 408 and the threaded end 230a of the center bolt not projecting from the throughbore 234 into the female locating member 232, as best seen in FIG. 6a. This helps ensure that the center bolt 230 is shorter than a distance between the mounted retaining ring 408 and the threaded bore 119 of the male locating member 118, when the assembly is in both the second and third positions, thereby allowing the assembly to be moved into both the second and third positions without having the center bolt 230 interfere with the male member 118.

After releasing the cutter body 200, the operator may then, with the assistance of a wrench, screwdriver or other appropriate tool, push up the center bolt 230 such that its threaded end 230a enters the threaded bore 119 of the conically tapered male member 118, and then tighten the bolt 230 to thereby secure the cutter body 200 to the adapter 100 as the threaded end 203a engages the threaded portion 119b of the threaded bore 119.

Adapter first surface 102, cutter body first surface 202, male member 118, and female member 232 preferably are all ground to help ensure a good fit. In a preferred embodiment, the tolerances of these surfaces are such that, during assembly, male member 118 and female member 232 initially touch first, with the adapter first surface 102 and cutter body first surface 202 touching, upon tightening of the center bolt 230.

Figure 7B:
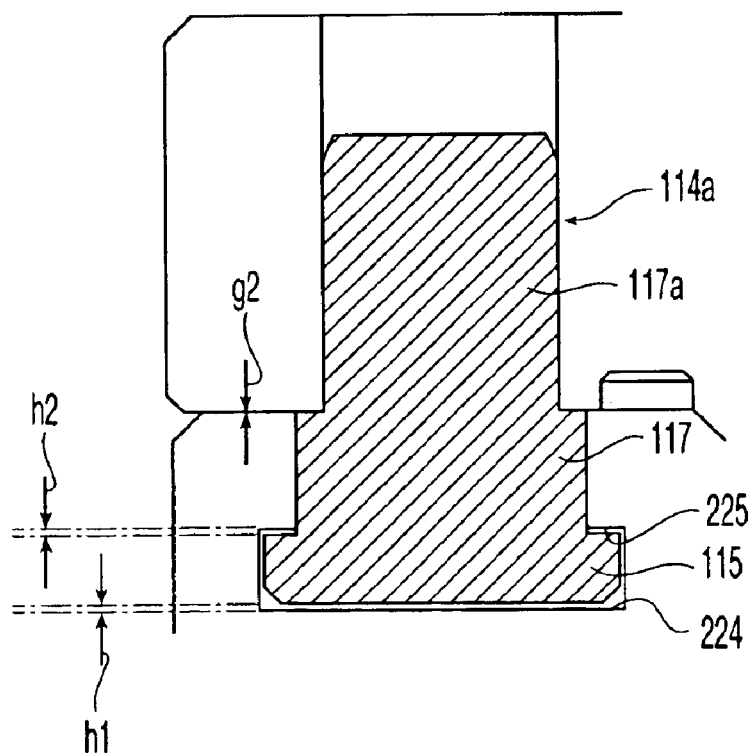
FIG. 7b is a detailed view of a portion of FIG. 6b.
Figure 8:
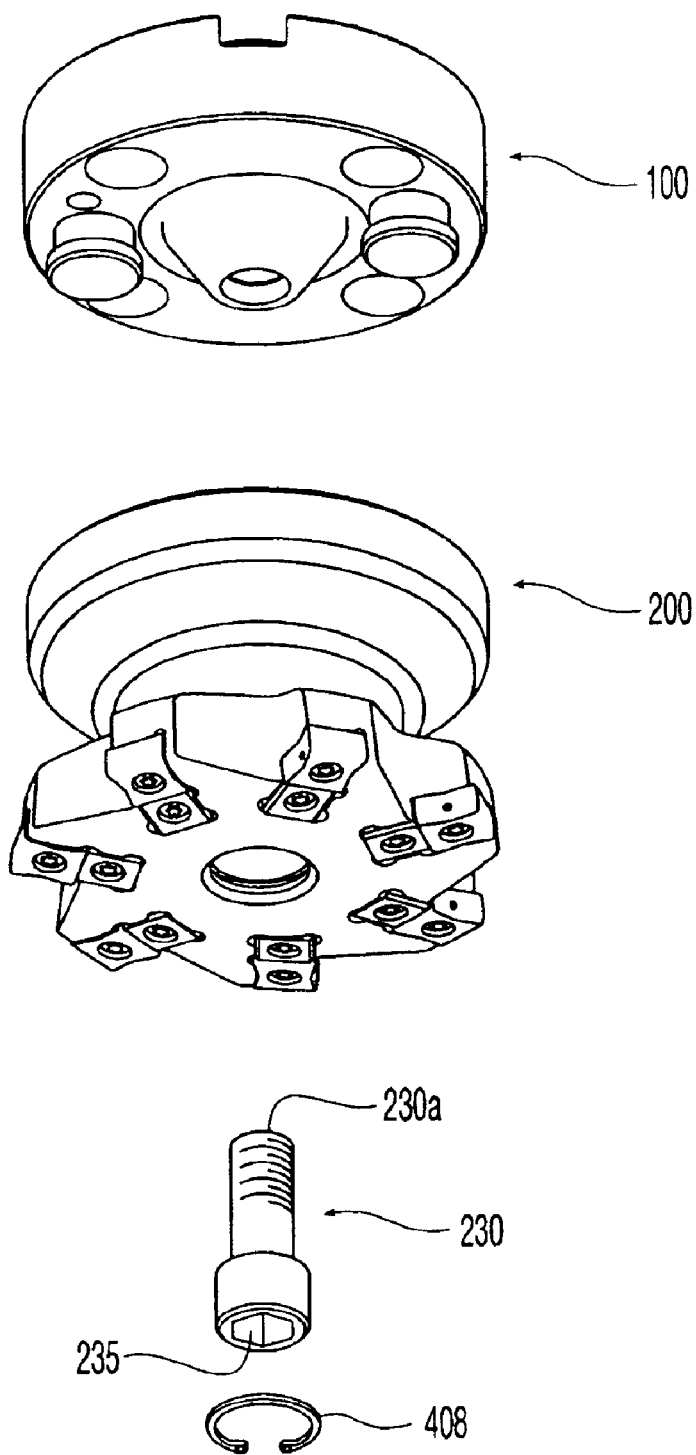
FIG. 8 is an exploded view of a cutting assembly showing the adapter, cutter body, bolt and retaining ring.

The drive pins 114a, 114b, however, need not be tightened to secure the cutter body 200 to the adapter 100. In fact, as the center bolt is tightened, the heads 115 of the drive pins 114a, 114b, which formerly abutted the undersides 225 of the grooves' back walls 223 to support the cutter body 200, separate slightly from these undersides 225, and move to a final position in which a first gap of distance h1 separates the upper side of drive pin head 115 from groove bottom 224, and a second gap of distance h2 separates the lower side of drive pin head 115 from the underside 225 of back wall 223. Accordingly, the drive pins 114a, 114b are not in tight engagement with the retaining portions of the drive grooves, upon tightening of the center bolt 230. In moving to this final position, however, the gap between the first surface 102 of the adapter 100 and the first surface 202 of the cutter body 200 closes to a distance of g2=0 such that the first surfaces 102, 202 abut one another, as seen in FIG. 7b.

By virtue of the cutter body hanging from the adapter, and further by virtue of the center bolt 230 being loosely retained in the throughbore 234 and being prevented from falling out of the cutter body's throughbore 234 by the retaining ring 408 when the cutter body's first surface 202 faces upwards, an operator can change a cutter body using just one hand. This is especially significant when the milling cutter assembly is located in an enclosure or other environment where it is difficult for an operator to reach, and/or use both hands to replace the cutter body.

Since the drive pins turn the cutter body upon abutment with the back walls 225 of the grooves, the orientation of the grooves in a left-handed cutter body is opposite that in a right-handed cutter body—i.e., the insertion portions are circumferentially "clockwise" relative to their adjoining retaining portions in a left-handed cutter body and are circumferentially counter-clockwise relative to their adjoining retaining portions in a right-handed cutter body.

It is possible to use the same adapter with both left- and right-handed cutter bodies so long as the insertion portions 216 of the grooves are in the same place in both the left- and right-handed cutter bodies. However, this may result in an operator inadvertently installing a left-handed cutter body instead of a right-handed cutter body, or vice versa, when it becomes desirable to selectively replace one with the other.

To help prevent an operator from doing this, the spacing of the grooves in a left-handed cutter body preferably differs from the spacing of the grooves in a right-handed cutter body, and the placement of drive pins in an adapter that mates with a left-handed cutter body preferably differs from the placement of drive pins in an adapter that mates with a right-handed cutter body. The differences in spacings, coupled with the geometry of the male and female members, are all such that it would not normally be possible for an operator to mount (a) a right-handed cutter body on an adapter intended for use with a left-handed cutter body, or (b) a left-handed cutter body on an adapter intended for use with a right-handed cutter body. Differences in circumferential and/or radial spacings of the drive pins and grooves may be used. Thus, one possibility is have the centers of the two drive pins and the centers of the two groove insertion portions for the right-handed adapter and cutter body 180° apart, while the centers of the two drive pins and the centers of the two groove insertion portions for the left-handed adapter and cutter body are, say 170° apart in one circumferential direction. Another possibility is to have these centers a first radial distance from the central axes A and B in the let-handed adapter and cutter body, respectively, and to have these centers a second radial distance different from the first radial distance, in right-handed adapter and cutter body.

Accordingly, the present invention contemplates a collection of milling cutting assembly components comprising at least two adapters in accordance with the present invention, a left-handed cutter body and a right-handed cutter body. The first, "left-handed" adapter has its drive pins in a first set of locations and the second, "right-handed" adapter has its drive pins in a second set of locations that is different from the first set of locations. The left-handed cutter body has its grooves' insertion portions positioned to correspond to the location of the drive pins in the "left-handed" adapter while the right handed cutter body has its groove openings positioned to correspond to the location of the drive pins in the "right-handed" adapter.

Figure 4:
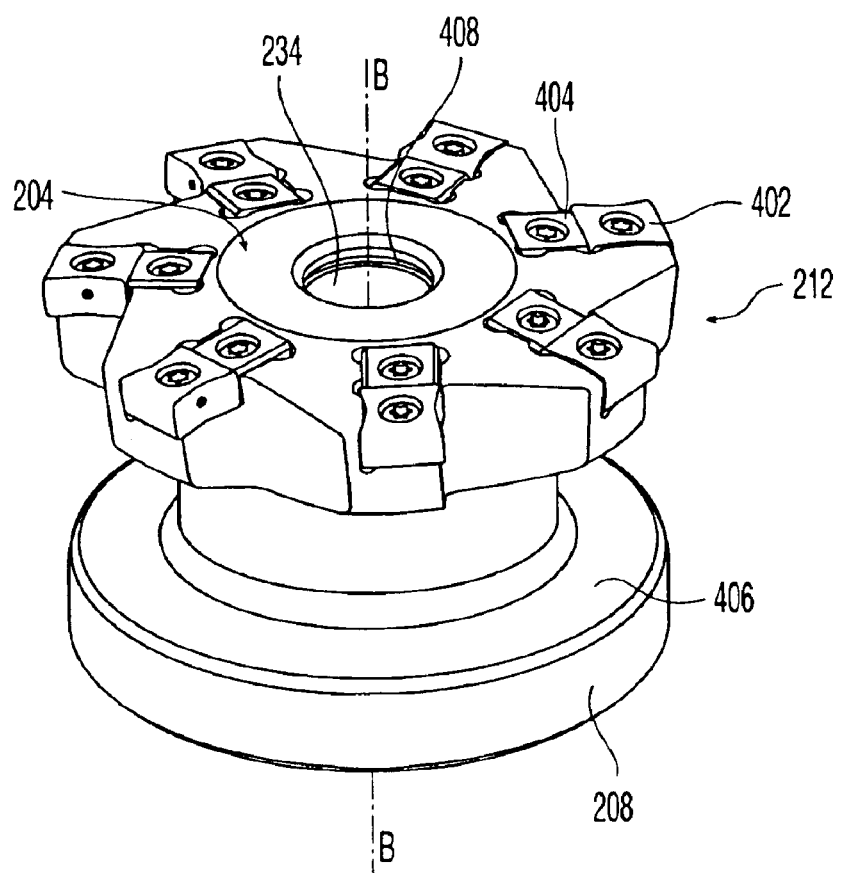
FIG. 4 is a perspective view of the cutter body of FIG. 2 showing its second side.

FIG. 4 shows the second side of the cutter body 200. The cutting head portion 212 is provided with a plurality of locations for accommodating cutting inserts 402. The locations are evenly distributed in a circumferential direction around the central axis B. In the embodiment shown, a total of six such locations are provided. Each of these locations is provided with a cutting insert 402 that is positioned with the assistance of an adjustment seat 404. It is understood, however that the cutting head arrangement is not critical to the present invention. Thus, a different number of cutting inserts, a different seating arrangement relative to the central axis B, and whether or not the cutting inserts are positioned with the use of adjustment seats, etc. may all be changed without departing from the present invention.

As seen in FIG. 4, the grooves 214a, 214b formed on the first side 202 of the cutter body preferably do not penetrate the back surface 406 of the cylindrical base member 208. Thus, the grooves are open only to the first side of the cutter body and the groove bottom surface 224 prevents the drive pins' heads 115 from passing entirely through the cylindrical base member 208, during assembly.

Although the present invention has been described to a certain degree of particularity, it should be understood that various alterations and modifications can be made without departing from the spirit or scope of the invention as hereinafter claimed.

What is claimed is:

1. A milling cutting tool assembly comprising:
   an adapter having an adapter central axis and comprising:
     adapter first and second sides;
     a centrally located male locating member projecting from the adapter first side and provided with a threaded bore in a central portion thereof; and
     a plurality of circumferentially spaced-apart drive pins projecting from the adapter first side; and
   a cutter body having a cutter central axis, and comprising:
     cutter body first and second sides;
     a centrally located female locating member formed in the cutter body first side;
     a plurality of circumferentially spaced-apart drive grooves formed in the cutter body first side, each drive groove having an insertion portion connected to a retaining portion; and
     a throughbore extending along the cutter central axis and communicating with the female locating member; and
   a bolt occupying the throughbore;
   wherein:
     the assembly is adjustable from a first position in which the adapter and the cutter body are separated from one another, to a second position in which the male locating member is nested in the female locating member and at least two drive pins are positioned in a corresponding number of respective drive grooves' insertion portions;
     the assembly is further adjustable from said second position to a third position in which the at least two drive pins are positioned in their respective drive grooves' retaining portions, upon rotation of the cutter body relative to the adapter; and when the assembly is in the third position, the cutter body is securable to the adapter upon insertion of the bolt into the threaded bore of the male locating member, and without tightening the drive pins in the retaining portions of the grooves.

2. The assembly according to claim 1, further comprising:

a ring mounted proximate to the second side of the cutter body and configured to retain the bolt in the throughbore, when the cutter body is separated from the adapter.

3. The assembly according to claim 2, wherein, when the cutter body is separated from the adapter, and the cutter body first side faces upwards, a threaded end of the bolt does not project from the throughbore into the female locating member.

4. The assembly according to claim 1, wherein the cutter body comprises a base member spaced apart from a cutting head by a neck portion.

5. The assembly according to claim 1, wherein each groove is provided with a bottom surface that prevents access to heads of the drive pins, when the assembly is in either the second or third position.

6. The assembly according to claim 1, wherein, when the cutter body is secured to the adapter, heads of the drive pins are spaced apart from undersides of back walls of the retaining portions of the grooves, and also from bottom surfaces of the grooves.

7. The assembly according to claim 1, wherein the male locating member projects from a recess formed in a central portion of the adapter first side.

8. The assembly according to claim 1, wherein a diameter of the male locating member, at its base, is between 30–50% of the diameter of the adapter.

9. The assembly according to claim 1, wherein a height of the male locating member is between 10–20% of the diameter of the adapter.

10. The assembly according to claim 1, wherein no more than four drive pins and four drive grooves are provided.

11. The assembly according to claim 1, wherein the adapter second side is provided with a keyway and a hub that are configured to mate with a spindle.

12. A method for assembling a milling cutting tool comprising an adapter and a cutter body, wherein the adapter has previously been mounted in an inverted position, the adapter having a male locating member provided with a threaded bore in a central portion thereof, and a plurality of circumferentially spaced-apart drive pins, and wherein the cutter body is provided with a female locating member, a plurality of circumferentially spaced-apart drive grooves, each drive groove having an insertion portion connected to a retaining portion, and a throughbore communicating with the female locating member;

the method comprising:

(a) raising the cutter body towards the adapter with the female locating member and drive grooves facing upwards, until the drive pins enter the insertion portions of the drive grooves and the male locating member enters the female locating member;

(b) rotating the cutter body such that the drive pins enter the retaining portions of the drive grooves;

(c) releasing the cutter body such that it is suspended from the adapter by virtue of the retaining portions of the drive grooves being supported by the drive pins; and (d) inserting a bolt into the threaded bore of the male locating member, thereby securing the cutter body to the adapter without tightening the drive pins in the retaining portions.

13. The method according to claim 12, wherein each of steps (a)–(d) are performed by a human operator using one hand.

14. The method according to claim 12, comprising modifying the cutter body so as to retain the bolt in the throughbore, during step (a).

15. The method according to claim 14, comprising providing a bolt that is sufficiently short such that an end of the bolt does not project into the female locating member, during step (a).

16. The method according to claim 14, comprising seating a ring in a recess to return the bolt, the ring having a diameter smaller than that of a head of the bolt.

17. A milling cutting tool comprising:

an adapter having an adapter central axis and comprising:
    adapter first and second sides;
    a centrally located male locating member projecting from the adapter first side and provided with a threaded bore in a central portion thereof; and
    a plurality of circumferentially spaced-apart drive pins projecting from the adapter first side; and a cutter body having a cutter central axis and comprising:
    cutter body first and second sides;
    a centrally located female locating member formed in the cutter body first side;
    a plurality of circumferentially spaced-apart drive grooves formed in the cutter body first side, each drive groove having an insertion portion connected to a retaining portion;
    a throughbore extending along the cutter central axis and communicating with the female locating member; and a bolt inserted into the threaded bore of the male locating member to thereby secure the cutter body to the adapter; and wherein:
    the male locating member is nested in the female locating member; and
    the drive pins are positioned in the retaining portions of the drive grooves without being in tight engagement therewith.

18. The tool according to claim 17, further comprising:

a ring mounted proximate to the second side of the cutter body and configured to retain the bolt in the throughbore.

19. The tool according to claim 17 wherein the cutter body comprises a base member spaced apart from a cutting head by a neck portion.

20. The tool according to claim 17, wherein each groove is provided with a bottom surface that prevents access to heads of the drive pins.

21. The tool according to claim 17, wherein, heads of the drive pins are spaced apart from undersides of back walls of the retaining portions of the grooves, and also from bottom surfaces of the grooves.

22. The tool according to claim 17, wherein the male locating member projects from a recess formed in a central portion of the adapter first side.

23. The tool according to claim 17, wherein a diameter of the male locating member, at its base, is between 30–50% of the diameter of the adapter.

24. The tool according to claim 17 wherein a height of the male locating member is between 10–20% of the diameter of the adapter.

25. The tool according to claim 17 wherein no more than four drive pins and four drive grooves are provided.

26. The tool according to claim 17, wherein the adapter second side is provided with a keyway and a hub that are configured to mate with a spindle.

27. A cutter body having a cutter central axis and comprising:
cutter body first and second sides;
a centrally located female locating member formed in the cutter body first side;
a plurality of circumferentially spaced-apart drive grooves formed in the cutter body first side, each drive groove having an insertion portion connected to a retaining portion and a bottom surface;
a plurality of locations for accommodating cutting inserts;
a throughbore extending along the cutter central axis and communicating with the female locating member; and
a bolt loosely retained in the throughbore.

28. The cutter body according to claim 27, further comprising a ring configured to retain the bolt in the throughbore.

29. The cutter body according to claim 28, wherein:
the ring is seated in a circumferential recess formed proximate to the second side of the cutter body; and
the ring has a diameter smaller than that of a head of the bolt, so as to prevent the bolt from being removed from the throughbore.

30. The cutter body according to claim 27, wherein, when the cutter body is oriented with the cutter body first side facing upwards, a threaded end of the bolt does not project from the throughbore into the female locating member.

31. The cutter body according to claim 27, comprising a base member spaced apart from a cutting head by a neck portion.

32. The cutter body according to claim 27, wherein each of said plurality of locations for accommodating cutting inserts is configured to also accommodate an adjustment seat.

33. The cutter body according to claim 27, wherein the retaining portion is associated with opposing outer and inner groove sidewalls which at least partially overhang the bottom surface.

34. A set of at least four milling cutting tool components including at least first and second adapters, a left-handed cutter body and a right-handed cutter body; wherein:
the first adapter has a conically tapered male locating member provided with a threaded bore in a central portion thereof, and a plurality of circumferentially spaced-apart drive pins arranged in a first set of locations;
the left-handed cutter body has a conically tapered female locating member, a throughbore that passes through the female locating member, and a plurality of circumferentially spaced-apart drive grooves, each drive groove having an insertion portion connected to a retaining portion and a bottom surface, the insertion portions of the left-handed cutter body positioned to mate with the drive pins of the first adapter; and
the second adapter has a conically tapered male locating member provided with a threaded bore in a central portion thereof, and a plurality of circumferentially spaced-apart drive pins arranged in a second set of locations that is different from the first set of locations;
the right-handed cutter body has a conically tapered female locating member, a throughbore that passes through the female locating member, and a plurality of circumferentially spaced-apart drive grooves, each drive groove having an insertion portion connected to a retaining portion and a bottom surface, the insertion portions of the right-handed cutter body positioned to mate with the drive pins of the second adapter.

35. A cutter body baying a cutter central axis and comprising:
cutter body first and second sides;
a centrally located female locating member formed in the cutter body first side;
a plurality of circumferentially spaced-apart drive grooves formed in the cutter body first side, each drive groove having an insertion portion connected to a retaining portion and a bottom surface;
a throughbore extending along the cutter central axis and communicating with the female locating member;
a bolt loosely retained in the throughbore; and
a ring positioned proximate to the second side of the cutter body, wherein the ring prevents the bolt from being removed from the throughbore.

36. The cutter body according to claim 35, wherein the ring is seated a circumferential recess.

37. The cutter body according to claim 36, wherein the ring has diameter smaller than that of a head of the bolt, so as to prevent the bolt from being removed from the throughbore.

38. The cutter body according to claim 35, further comprising a cutting head having a plurality of locations for accommodating cutting inserts.

39. The cutter body according to claim 38, wherein the cutter bed is a milling cutter body.

40. The cutter body according to claim 35, wherein the retaining portion is associated with opposing outer and inner groove sidewalls which at least partially overhang the bottom surface.

41. A cutter body having a cutter central axis and comprising:
cutter body first and second sides;
a centrally located female locating member formed in the cutter body first side;
a plurality of circumferentially spaced-apart drive grooves formed in the cutter body first side, each drive groove having an insertion portion connected to a retaining portion and a bottom surface, the retaining portion being associated with opposing outer and inner groove sidewalls which at least partially overhang the bottom surface; and
a throughbore extending along the cutter central axis and communicating with the female locating member.

42. The cutter body according to claim 41, wherein the retaining portion is also associated with a groove back wall which at least partially overhangs the bottom surface.

43. The cutter body according to claim 41, further comprising:
a bolt loosely retained in the throughbore; and
a ring positioned proximate to the second side of the cutter body, wherein the ring prevents the bolt from being removed from the throughbore.

44. The cutter body according to claim 43, wherein the ring is seated a circumferential recess.

45. The cutter body according to claim 44, wherein the ring has a diameter smaller than that of a head of the bolt, so as to prevent the bolt from being removed from throughbore.

46. The cutter body according to claim 41, further comprising a cutting head having a plurality of locations for accommodating cutting inserts.

47. The cutter body according to claim 46, wherein the cutter is a milling cutter body.

48. A cutting tool component comprising:

a milling cutter body baying first and second sides and a cutter central axis;

a centrally located female locating member formed in the side, the female locating member tapering from a widest portion at the milling cutter body first side to a narrowest portion within the milling cutter body at a point between the first and second sides;

a plurality of circumferentially spaced-apart drive grooves formed in the first side, each drive groove having an insertion portion connected to a retaining portion and a bottom surface;

a throughbore extending along the cutter central axis and communicating with the female locating member; and a bolt loosely retained in the throughbore.

* * * * *